United States Patent [19]

Ibach et al.

[11] 4,290,326
[45] Sep. 22, 1981

[54] METHOD OF MAKING A FORGED MOWING FINGER

[75] Inventors: Adolf Ibach; Heinz Könen, both of Remscheid, Fed. Rep. of Germany

[73] Assignee: Carl Sülberg, Remscheid, Fed. Rep. of Germany

[21] Appl. No.: 4,312

[22] Filed: Jan. 17, 1979

Related U.S. Application Data

[62] Division of Ser. No. 873,244, Jan. 30, 1978, abandoned.

[30] Foreign Application Priority Data

Nov. 18, 1977 [DE] Fed. Rep. of Germany ....... 2751523

[51] Int. Cl.³ .............................................. B21K 19/00
[52] U.S. Cl. ..................................... 76/101 R; 72/352
[58] Field of Search ............. 76/101 R, 101 C, 104 R, 76/104 A; 56/307–311; 72/352, 377

[56] References Cited

U.S. PATENT DOCUMENTS

| 2,776,482 | 1/1957 | Hafekost | 76/104 A |
| 3,682,021 | 8/1972 | Haban | 76/101 R |
| 3,978,645 | 9/1976 | Bennett et al. | 56/310 |

FOREIGN PATENT DOCUMENTS 1926033  11/1970  Fed. Rep. of Germany .... 76/104 R

Primary Examiner—Roscoe V. Parker
Attorney, Agent, or Firm—Michael J. Striker

[57] ABSTRACT

A forged mowing finger for use in mowers having reciprocable cutter blades has a body which is elongated transverse to the direction of reciprocation of the cutter blades and which has a surface adapted to face and coact with the cutter blades. The surface is bounded by lateral faces which define with the surface respective cutting edges. The lateral faces each include with the surface of the body a cutting angle which is smaller than 90°. A method of making such a finger is also provided.

3 Claims, 8 Drawing Figures

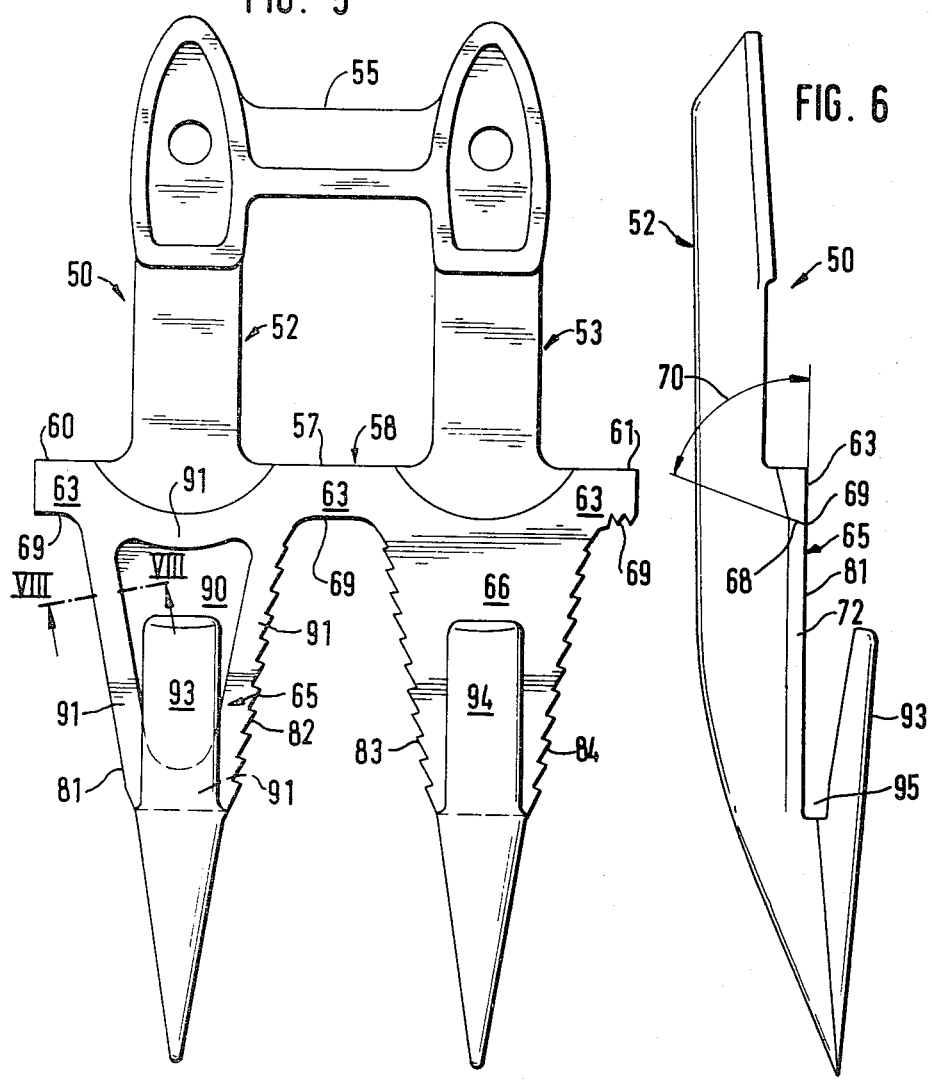

METHOD OF MAKING A FORGED MOWING FINGER

This is a division of application Ser. No. 873,244, filed Jan. 30, 1978, and now abandoned.

BACKGROUND OF THE INVENTION

The present invention relates to mowing fingers for use in mowers, and to a method of making such mowing fingers.

Forged mowing fingers of the general type to which the invention is directed are known from the prior art. For example U.S. Pat. No. 3,978,645 discloses such a mowing finger having a cutting surface bounded by lateral faces which include with the cutting surface a cutting angle of 90°. The finger also has a small arm portion, lateral edge faces of which also define with the cutting surface an angle of 90°.

It has been found, however, that substantial improvements can be obtained by deviating from the 90° angle of the prior art, in order to produce optimum cutting conditions by a cooperation of the lateral faces and the reciprocable cutter blades of a mower in connection with which such mowing fingers are used. According to the prior art the lateral faces may also be serrated in which case the mowing finger is first produced by forging and thereafter the serrations are produced by material-removing techniques, e.g. milling or the like. It has been found that the relatively expensive separate step of producing the serrations by material-removing methods can be eliminated and the serrations produced in a simple and very inexpensive manner.

SUMMARY OF THE INVENTION

Accordingly, it is an object of the present invention to provide improvements over the prior art.

More particularly, it is an object of the present invention to provide an improved forged mowing finger for use in mowers.

Another object of the invention is to provide such an improved forged mowing finger which can be manufactured very inexpensively and offers optimum cutting characteristics.

An additional object of the present invention is to provide a method of making such an improved mowing finger.

In pursuance of these objects and of others which will become apparent hereafter, one feature of the invention resides in a forged mowing finger for use in mowers having reciprocable cutter blades. Briefly stated, such a finger may comprise at least one finger body which is elongated transverse to the direction of reciprocation of the cutter blades. This body has a surface adapted to face and coact with the cutter blades and bounded by lateral faces which define with this surface respective cutting edges. According to the invention these lateral faces each include with the surface of the finger body a cutting angle that is smaller than 90°. The precise angle can be selected in dependence upon the particular operating conditions which are expected to be encountered. For normal general-use operating conditions the cutting angle will be at least approximately 70°, but it will always be smaller than 90°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 is a top-plan view of another embodiment having a double-finger;

FIG. 6 is a side view of the embodiment in FIG. 5;

FIG. 7 is a front end view of the embodiment of FIG. 5; and

FIG. 8 is a section taken on line VIII—VIII of FIG. 5.

DESCRIPTION OF THE PREFERRED EMBODIMENTS

Figure 2:
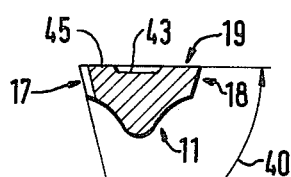
FIG. 2 is a section taken on line II—II of FIG. 1.
Figure 1:
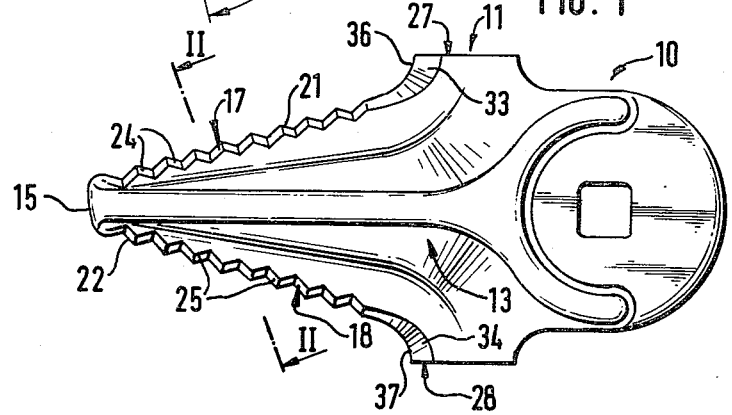
FIG. 1 is a bottom-plan view showing a mowing finger embodying the invention.
Figure 3:
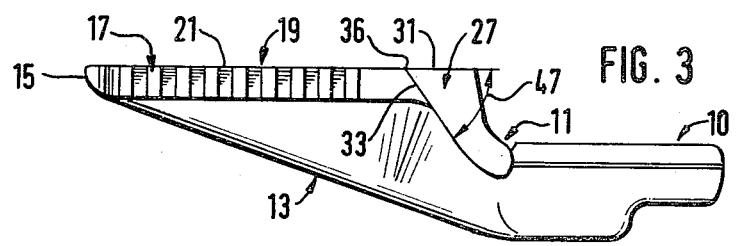
FIG. 3 is a side view of the finger shown in FIG. 1.

Referring now to the drawing, and firstly to the embodiment illustrated in FIGS. 1-4 of the same, it will be seen that in these Figures a forged guard or mowing finger 10 is illustrated which is configurated as a so-called "mulching" finger or stub guard. The remainder of the mower with which such finger is to be used, is not shown because it is not essential for an understanding of the invention. However, reference may be had for details to the aforementioned U.S. Pat. No. 3,978,645.

In mowers of the type with which the mowing fingers are to be used there are provided cutter blades which extend transversely to the elongation of the mowing finger 10 and which are movable (e.g. reciprocable) in the transverse direction. Such cutter blades are also shown in the aforementioned U.S. Pat.

The finger 10 has a finger body 11 of a steplike configuration provided with a back portion 13 which is formed with lateral faces 17 and 18 that converge to form a point 15 of the finger. These faces 17, 18 form cutting edges 21 and 22 with a horizontal surface 19 (see FIG. 3) of the finger 10. The surface 19 may be provided, subsequent to forging of the finger body 11 by milling or the like. As shown in FIG. 2 the lateral faces 17, 18 define or include with the surface 19 a cutting angle 40 which is smaller than 90°. The faces 17, 18 may be provided with respective serrations 24 and 25.

Figure 4:
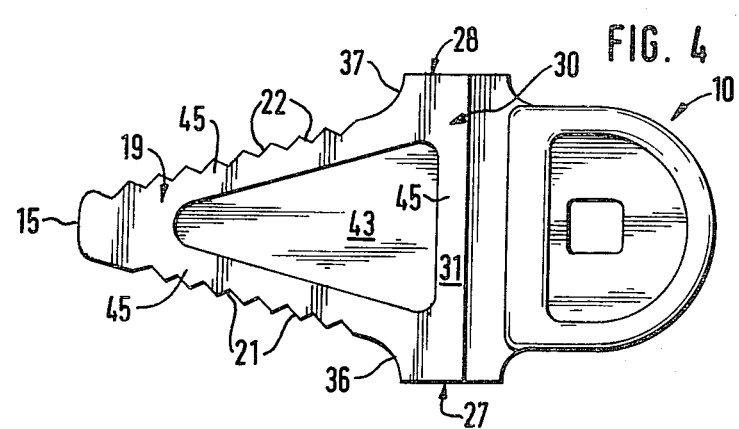
FIG. 4 is a top-plan view of the finger in FIG. 1.

The body 11 is provided with lateral projections 27, 28 of trash bar means or an arm-like portion 30, as shown in FIG. 4. An upper surface 31 of the portion 30 (FIG. 3) is coplanar with the surface 19 and defines with respective forward edge faces 33 and 34 of the respective portions 27, 28 further cutting edges 36 and 37 which continuously merge with the respective cutting edges 21 and 22. The edge faces 33 and 34 also include with the upper surface 31 a cutting angle 47 which is smaller than 90°.

The surface 19 is provided with a depression 43. As FIG. 4 shows most clearly, the depression 43 is circumferentially surrounded by a marginal portion 45 of the surface 19.

According to the present invention the faces 17, 18, 33 and 34 as well as the serrations 24 and 25 and the depression 43 are all produced in a single operation, namely as part of the forging operation of the body 11.

The serrations 24, 25 could be omitted. However, for certain applications the provision of such serrations is advantageous because it increases the cutting effectiveness. By having the serrations inclined to the surface 19 at the same cutting angle as the respective edge faces, the cutting effectiveness is further improved.

The cutting edges, the edge faces or lateral faces and the marginal zone of the surface 19 are usually hardened after forging. The depression 43 is provided because, particularly in the case of inductive hardening, it prevents or at least substantially counteracts a twisting tendency which causes twisting of the surface 19. Moreover, providing the depression 43 permits a better contact of the cutter blades with the surface 19 and thus improves cutting characteristics. The reason for this is that the cutting edges of the finger tend in operation to wear more readily than the center portion of the surface 19 with the result that if the surface 19 is not provided with the recess 43, the center portion soon projects above the marginal portions as the material of the margins wears away. This, then, results in the formation of a gap between the marginal portions (and hence the cutting edges) of the finger 10 and the coacting surfaces of the cutter blades and consequently a reduction in the cutting effectiveness. By providing the depression 43 this problem is eliminated or at least substantially reduced and in addition a reduction in contact friction between surface 19 and the coacting surfaces of the cutter blades is obtained.

It has been found that it is particularly advantageous if the depression 43 has a depth of between approximately 0.5–1.0 mm. The edges of the depression 43 may extend to within at least 3 mm. of the cutting edges of the finger, and if the depression 43 is circumferentially surrounded by the marginal zone 45 as shown in FIGS. 1–5, the width of the zone 45 is advantageously 3 mm. or greater.

By having the lateral faces 33 and 34 of the arm portion 30 include with the upper surface 31 a cutting angle 47 which is smaller than 90°, optimum cutting effectiveness is obtained also for this portion 30. The faces 33 and 34 may themselves be provided with serrations in order to further improve the cutting effectiveness. These serrations should also be inclined to the upper surface 31 at the cutting angle of less than 90°.

A further embodiment of the invention is illustrated in FIGS. 5–8, namely in form of a sickle guard or mowing finger 50 which is configurated as a double-finger. This finger 50 has two bodies 52 and 53 which at their rearward ends are connected by a bridge 55 and forwardly of the rearward ends are connected by an intermediate bridge 57 of trash bar means or an arm 58 so as to form a unit. The arm 58 is provided with respective lateral projections 60 and 61 and an upper surface 63. Each of the bodies 52 and 53 is provided with a cutting surface 65 and 66 produced by milling or the like, and these cutting surfaces 65 and 66 are coplanar with the upper surface 63 of the arm 58.

The arm 58 is provided with an edge face 68. FIG. 6 shows that the edge face 68 includes with the upper surface 63 a cutting edge 69 and a cutting angle 70 which is smaller than 90°.

Lateral faces 72 and 73 of the body 52, and lateral faces 74 and 75 of the body 53 each include with the respective cutting surfaces 65, 66 of these bodies a cutting angle 77 which is smaller than 90°. The lateral faces 72–75 define with the respective cutting surfaces 65, 66 a series of cutting edges which are identified with reference numerals 81–84 (see especially FIG. 5). The cutting edge 81 is a straight cutting edge, whereas the cutting edges 82–84 may be provided with serrations 86, 87 and 88. Evidently, the cutting edges could all be straight or they could all be serrated, if so desired. The serrations are of course formed in the respective lateral faces 72–75, or in any combinations of these faces 72–75. The cutting surface 65 is provided with a depression 90 which is circumferentially surrounded by a marginal zone 91 of the cutting surface 65. A similar depression may be provided in the cutting surface 66.

Each of the bodies 52, 53 is provided with a lip 93 and 94, respectively. Slots 95 (see FIG. 6) remain between the lips 93 and 94 and the cutting surfaces 65, 66, respectively, to receive the cutter blades (not shown) of the mower.

The depression 90 can be formed in one operation, namely during the forging of the fingers 52, 53, if the lip 93 is later welded to the body 52 or otherwise secured to the body 52 in known manner. The cutting surface 66 may, as already pointed out, also be provided with a depression 90.

The lateral faces 72–75 are formed on the fingers 52, 53 during the forging of the same, i.e., in one and the same forging operation that produces the fingers. The same is true of the serrations 86–88 in the lateral faces 73–75, or in all lateral faces if this is preferred.

The portion of the cutting edge 69 at the lateral projection 61 of the arm 58 is serrated, due to the presence of the serration 97 in the lateral edge face 68 of the projection 61, as shown in FIGS. 5 and 7. A serration corresponding to the serration 97 may also be provided on the bridge 57 and on the other lateral projection 70 of the arm 50. The edge face 68 and the serration 97 are also formed in one operation during the forging of the finger bodies 52, 53.

The method according to the present invention will already have been understood from the previous description. It is that the respective lateral faces or edge faces and any serrations thereon as well as any depressions in the cutting surfaces may all be produced in one operation, namely during the forging which produces the respective finger bodies. This results in a substantial saving of time and labor because additional manufacturing steps are eliminated. This is particularly true of the formation of the serrations which are inclined at the respective cutting angle and which otherwise could be produced only on complicated machine tools and in a plurality of steps. Moreover, by producing the serrations during the forging of the respective finger bodies their strength is greater than if they were produced by material-removing techniques, due to the fact that during the forging the grain flow (fibers) of the material in the area of the serrations is not cut or disrupted, but instead is compacted and thus strengthened.

While the invention has been illustrated and described as embodied in a forged mowing finger for use in mowers, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. A method of making a mowing finger of an elongated, step-like configuration having a finger body defining a surface, a back portion formed with lateral faces that converge to a point of the finger and include with the surface angles smaller than 90° to form cutting edges with the surface, and a plurality of serrations in the cutting edges, said method comprising a single forging operation in which said body together with said back portion, lateral faces and said serrations are simultaneously finished.

2. A method as defined in claim 1, wherein a depression in the surface is simultaneously made during the single forging operation.

3. A method of making a mowing finger for use in mowers, comprising forging a mowing-finger body having a surface; and simultaneously and in the same forging step providing said body with respective lateral faces bounding said surface and inclined thereto at angles smaller than 90° and defining cutting edges with said surface, and also in the same forging step forming said lateral faces with serrations which are similarly inclined to said surface.

* * * * *